(12) United States Patent
Itano et al.

(10) Patent No.: US 8,400,546 B2
(45) Date of Patent: Mar. 19, 2013

(54) IMAGE CAPTURING DEVICE, IMAGE CAPTURING SYSTEM, AND METHOD OF DRIVING IMAGE CAPTURING DEVICE

(75) Inventors: Tetsuya Itano, Sagamihara (JP); Satoko Iida, Yokohama (JP); Hidekazu Takahashi, Zama (JP); Daisuke Yoshida, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 13/256,303
(22) PCT Filed: Apr. 28, 2010
(86) PCT No.: PCT/JP2010/057913
§ 371 (c)(1), (2), (4) Date: Sep. 13, 2011
(87) PCT Pub. No.: WO2010/134443
PCT Pub. Date: Nov. 25, 2010

(65) Prior Publication Data
US 2012/0026371 A1 Feb. 2, 2012

(30) Foreign Application Priority Data

May 18, 2009 (JP) .................................. 2009-120393
Apr. 23, 2010 (JP) .................................. 2010-100358

(51) Int. Cl.
*H04N 5/335* (2011.01)
(52) U.S. Cl. ......................................... 348/308; 348/294
(58) Field of Classification Search .................. 348/308, 348/294; 250/208.1
See application file for complete search history.

(56) References Cited

U.S. PATENT DOCUMENTS

| | | | |
|---|---|---|---|
| 7,126,102 B2 | 10/2006 | Inoue et al. | 250/214 R |
| 7,321,110 B2 | 1/2008 | Okita et al. | 250/208.1 |
| 7,408,210 B2 | 8/2008 | Ogura et al. | 257/233 |
| 7,462,810 B2 | 12/2008 | Kobayashi et al. | 250/208.1 |

(Continued)

FOREIGN PATENT DOCUMENTS

| | | |
|---|---|---|
| JP | 2003-051989 A | 2/2003 |
| JP | 2003-198949 A | 7/2003 |

OTHER PUBLICATIONS

Kawai et al, "Noise Analysis of High-gain, Low-noise Column Readout Circuits for CMOS Image Sensors", IEEE Transactions On Electron Devices, vol. 51, No. 2, Feb. 2004, pp. 185-194.

(Continued)

*Primary Examiner* — Tuan Ho
*Assistant Examiner* — Zhenzhen Wu
(74) *Attorney, Agent, or Firm* — Fitzpatrick, Cella, Harper & Scinto

(57) ABSTRACT

An image capturing device comprises a pixel array having a plurality of pixels each including a photoelectric conversion portion, a plurality of signal lines connected to the pixel array, a plurality of column amplifiers configured to respectively amplify signals transferred from the pixel array via the signal lines, the column amplifier comprising a first input terminal, a first output terminal, an amplifier having a second input terminal and a second output terminal, a feedback capacitance arranged between the second input terminal and the first output terminal, an input capacitance having an electrode connected to the first input terminal, and an electrode connected to the second input terminal, a first switch arranged between the second input terminal and the second output terminal, a second switch arranged between the first output terminal and the second output terminal, and a third switch arranged between a reference voltage terminal and the first output terminal.

10 Claims, 6 Drawing Sheets

U.S. PATENT DOCUMENTS

| | | | |
|---|---|---|---|
| 7,561,199 B2 | 7/2009 | Noda et al. | 348/308 |
| 7,692,713 B2 | 4/2010 | Kinugasa et al. | 348/350 |
| 7,719,587 B2 | 5/2010 | Ogura et al. | 348/302 |
| 7,825,974 B2 | 11/2010 | Itano et al. | 348/308 |
| 7,920,192 B2 | 4/2011 | Watanabe et al. | 348/308 |
| 8,013,369 B2 | 9/2011 | Iwata et al. | 257/290 |
| 8,023,025 B2 | 9/2011 | Itano et al. | 348/308 |
| 8,081,245 B2 | 12/2011 | Itano et al. | 348/301 |
| 8,085,319 B2 | 12/2011 | Ono et al. | 348/241 |
| 2005/0134715 A1* | 6/2005 | Fowler et al. | 348/308 |
| 2008/0006764 A1* | 1/2008 | Boemler | 250/208.1 |
| 2009/0122172 A1 | 5/2009 | Iwata et al. | 348/302 |
| 2009/0219424 A1 | 9/2009 | Sonoda et al. | 348/302 |
| 2009/0303340 A1 | 12/2009 | Itano | 348/222.1 |
| 2010/0134664 A1 | 6/2010 | Kuroda et al. | 348/280 |
| 2010/0328509 A1 | 12/2010 | Yamashita et al. | 348/300 |

OTHER PUBLICATIONS

Takahashi et al, "A ½.7 Inch Low-Noise CMOS Image Sensor for Full HD Camcorders", 2007 IEEE International Solid-State Circuits Conference, 2007, pp. 510-511, 618.

* cited by examiner

IMAGE CAPTURING DEVICE, IMAGE CAPTURING SYSTEM, AND METHOD OF DRIVING IMAGE CAPTURING DEVICE

TECHNICAL FIELD

The present invention relates to an image capturing device, an image capturing system, and a method of driving the image capturing device.

BACKGROUND ART

Japanese Patent Laid-Open No. 2003-051989 describes a method of amplifying, by a gain amplifier 41 in each column, signals output from the pixels in the column in a pixel array in which a plurality of pixels are two-dimensionally arrayed. When a MOS switch 54 is ON, the gain amplifier 41 operates as a voltage follower to initialize an inverting input portion 48. A pulse synchronous with that applied to a supply terminal 45 is applied to a supply terminal 58 to match the potential of an output portion 51 with the one obtained by adding the offset voltage of the gain amplifier 41 to the potential of a non-inverting input portion 47, thereby storing the offset of the gain amplifier 41 in a capacitance 23. A pulse applied to a pulse terminal 14 is set to high level to transfer an optical signal generated by a photodiode 2 to the gate of a MOS transistor 3 via a transfer MOS transistor 4. Note that a noise signal generated upon resetting the potential of a pixel 1 is superimposed on the optical signal transferred to the gate of the MOS transistor 3. When a pulse at high level is continuously applied to a pulse supply terminal 38, an amplification signal based on the optical signal on which the noise signal is superimposed is input to the gain amplifier 41. At this time, the MOS switch 54 is OFF, so the gain amplifier 41 operates as a voltage feedback operational amplifier (op amp) to amplify the input signal by the gain determined by the ratio of capacitances 55 and 56. Therefore, a signal obtained by superimposing the offset level of the gain amplifier 41 on the signal output from the gain amplifier 41 is stored in a capacitance 24. Letting C1 and C2 be the values of the capacitances 55 and 56, respectively, the gain is (C1+C2)/C2. When a horizontal scanning circuit 34 is driven, pulse signals output to a first column selection output line 35-1 and second column selection output line 35-2 sequentially become high level. The signals stored in the capacitances 23 and 24 are respectively output to horizontal output lines 27 and 28 via MOS transistors 29 and 30. The respective signals guided to the horizontal output lines 27 and 28 are input to a differential amplifier 39, where their difference is calculated, and an amplification signal based on the optical signal is output from an output terminal 40. According to Japanese Patent Laid-Open No. 2003-051989, the differential amplifier 39 eliminates the offset of the gain amplifier 41 with the foregoing operation.

In recent years, image capturing devices are increasingly required to attain higher performances, so increasing the number of pixels is a challenge of paramount importance in developing these devices. Any attempt to increase the number of pixels in image capturing devices inevitably results in a reduction in pixel size. A general image capturing device includes readout circuits corresponding to respective columns, and this makes it necessary to decrease the pitches of readout circuits with a reduced pixel size as well.

The inventor of the present invention found that a current mainstream image capturing device with a pixel pitch of about 1 µm to 3 µm has too low a level to allow a differential amplifier to sufficiently eliminate the offset of a gain amplifier. If the differential amplifier cannot sufficiently eliminate the offset of the gain amplifier, an image signal in which fixed pattern noise remains is output, and this leads to deterioration in quality of an image obtained based on that image signal.

Also, when a subsequent stage of an image capturing device eliminates the offset of a gain amplifier, it may not be sufficiently eliminated if the offset level of the gain amplifier is relatively high. In this case as well, an image in which fixed pattern noise remains is output, and this leads to deterioration in quality of an image obtained based on that image signal.

SUMMARY OF INVENTION

The present invention provides a technique useful in eliminating fixed pattern noise.

One of the aspects of the present invention provides an image capturing device comprising a pixel array in which a plurality of pixels each including a photoelectric conversion portion are arrayed, a plurality of signal lines connected to the pixel array, and a plurality of column amplifiers configured to respectively amplify signals transferred from the pixel array via the signal lines, wherein the column amplifier comprises a first input terminal, a first output terminal, an amplifier having a second input terminal and a second output terminal, a feedback capacitance arranged between the second input terminal and the first output terminal, an input capacitance having an electrode connected to the first input terminal, and an electrode connected to the second input terminal, a first switch arranged between the second input terminal and the second output terminal, a second switch arranged between the first output terminal and the second output terminal, and a third switch arranged between a reference voltage terminal and the first output terminal.

Further features of the present invention will become apparent from the following description of exemplary embodiments with reference to the attached drawings.

DESCRIPTION OF EMBODIMENTS

First Embodiment

Figure 1:
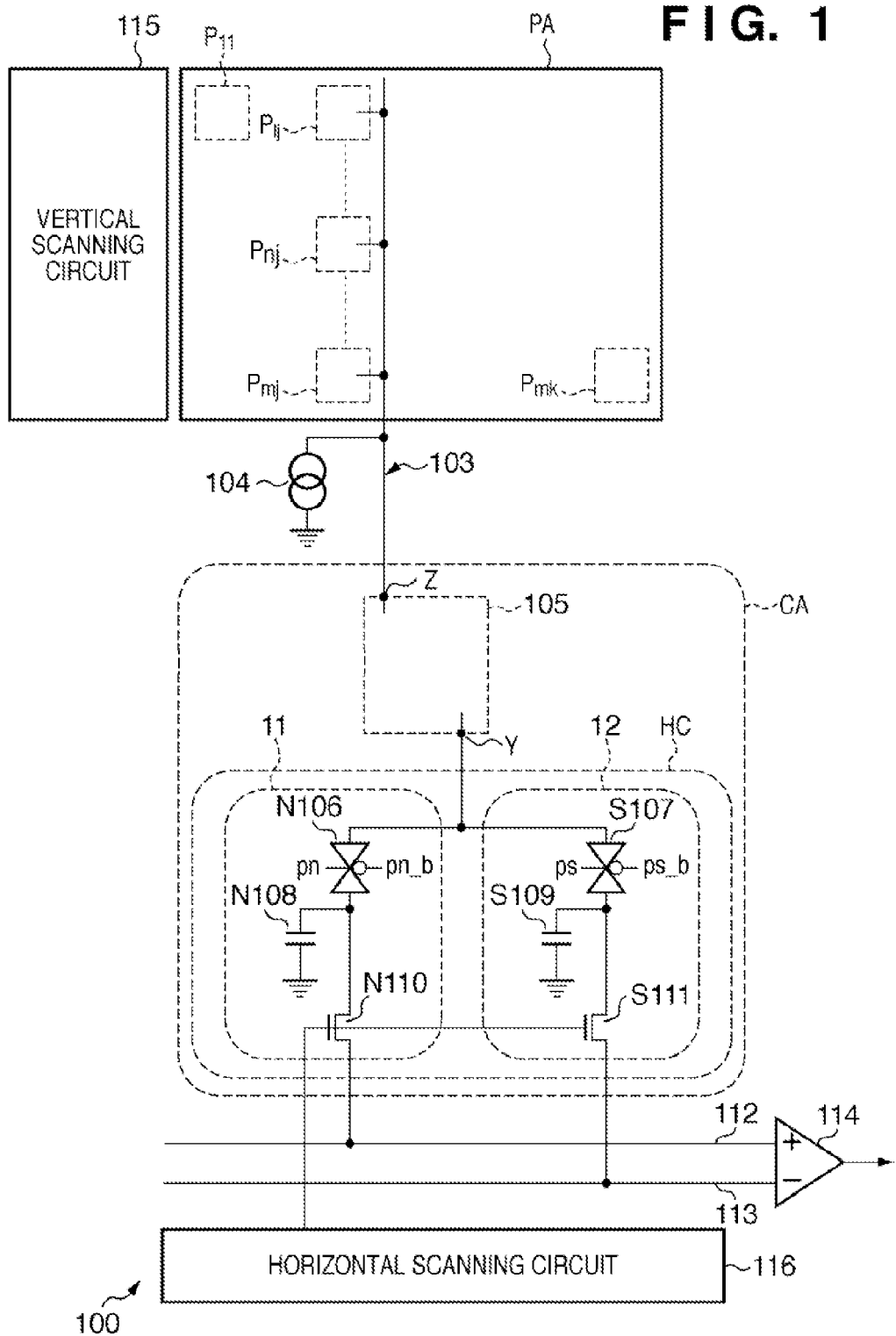
FIG. 1 is a block diagram showing the arrangement of an image capturing device according to the embodiment of the present invention.

An image capturing device 100 according to the first embodiment of the present invention will be explained with reference to FIGS. 1 to 4. FIG. 1 is a block diagram showing the arrangement of the image capturing device 100 according to the first embodiment.

The image capturing device 100 includes a pixel array PA, a plurality of signal lines 103 (only one signal line 103 is shown in FIG. 1), a vertical scanning circuit 115, a plurality of column amplifier units CA (only one column amplifier unit CA is shown in FIG. 1), a horizontal scanning circuit 116, and an output amplifier 114.

Figure 2:
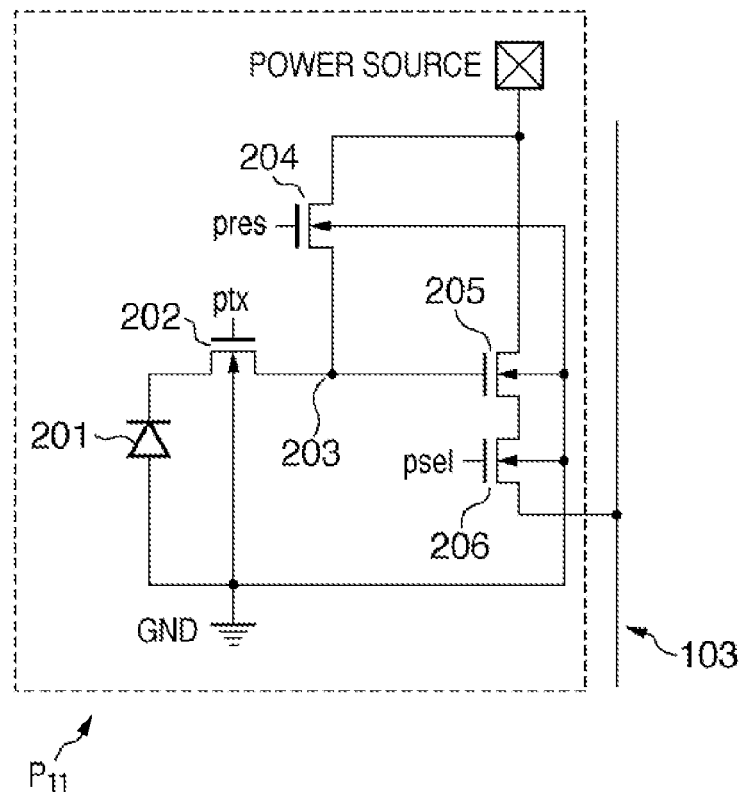
FIG. 2 is a circuit diagram showing the arrangement of a pixel in the first embodiment.

In the pixel array PA, a plurality of pixels $P_{11}, \ldots, P_{1j}, \ldots, P_{nj}, \ldots, P_{mj}, \ldots, P_{mk}$ are one- or two-dimensionally arrayed. FIG. 1 illustrates the structure of the pixel array PA in which a plurality of pixels are two-dimensionally arrayed. The pixel $P_{11}$ includes a photoelectric conversion portion 201, transfer portion 202, charge-voltage converter 203, reset portion 204, output portion 205, and selection portion 206, as shown in FIG. 2. Note that FIG. 2 is a circuit diagram showing the arrangement of the pixel $P_{11}$ in the first embodiment of the present invention. Although the arrangement of the pixel $P_{11}$ will mainly be explained herein, other pixels have the same arrangement as the pixel $P_{11}$.

The photoelectric conversion portion 201 generates a charge corresponding to the incident light. The photoelectric conversion portion 201 is, for example, a photodiode. The transfer portion 202 transfers the charge generated by the photoelectric conversion portion 201 to the charge-voltage converter 203. The transfer portion 202 is, for example, a transfer transistor, and transfers the charge generated by the photoelectric conversion portion 201 to the charge-voltage converter 203 upon being turned on when a transfer control signal ptx at active level is supplied from the vertical scanning circuit 115 to its gate. The charge-voltage converter 203 converts the transferred charge to a voltage. The charge-voltage converter 203 is, for example, a floating diffusion. The reset portion 204 resets the charge-voltage converter 203. The reset portion 204 is, for example, a reset transistor, and resets the charge-voltage converter 203 upon being turned on when a reset control signal pres at active level is supplied from the vertical scanning circuit 115 to its gate. The output portion 205 outputs a signal corresponding to the voltage of the charge-voltage converter 203 to the signal line 103. The output portion 205 is, for example, an amplifying transistor, and performs a source follower operation together with a current source load 104 connected to the signal line 103 to output a signal corresponding to the voltage of the charge-voltage converter 203 to the signal line 103. The output portion 205 outputs a noise signal corresponding to the voltage of the charge-voltage converter 203 to the signal line 103 while the charge-voltage converter 203 is reset by the reset portion 204. The output portion 205 also outputs an optical signal corresponding to the voltage of the charge-voltage converter 203 to the signal line 103 while the charge generated by the photoelectric conversion portion 201 is transferred to the charge-voltage converter 203 by the transfer portion 202. The selection portion 206 sets the pixel $P_{11}$ to a selected state/unselected state. The selection portion 206 is, for example, a selection transistor, and sets the pixel $P_{11}$ to a selected state upon being turned on when a selection control signal psel at active level is supplied from the vertical scanning circuit 115 to its gate. The selection portion 206 sets the pixel $P_{11}$ to an unselected state upon being turned off when a selection control signal psel at non-active level is supplied from the vertical scanning circuit 115 to its gate. The plurality of signal lines 103 are connected to the pixels in a plurality of columns in the pixel array PA. For example, the signal line 103 shown in FIG. 1 is connected to the pixels $P_{1j}, \ldots, P_{nj}, \ldots, P_{mj}$ in the jth column.

The vertical scanning circuit 115 is driven so that readout rows from which signals are to be read out in the pixel array PA are selected so as to vertically scan a plurality of rows in the pixel array PA and signals are output from the pixels (readout pixels) in the readout rows to the signal lines 103.

Figure 3:
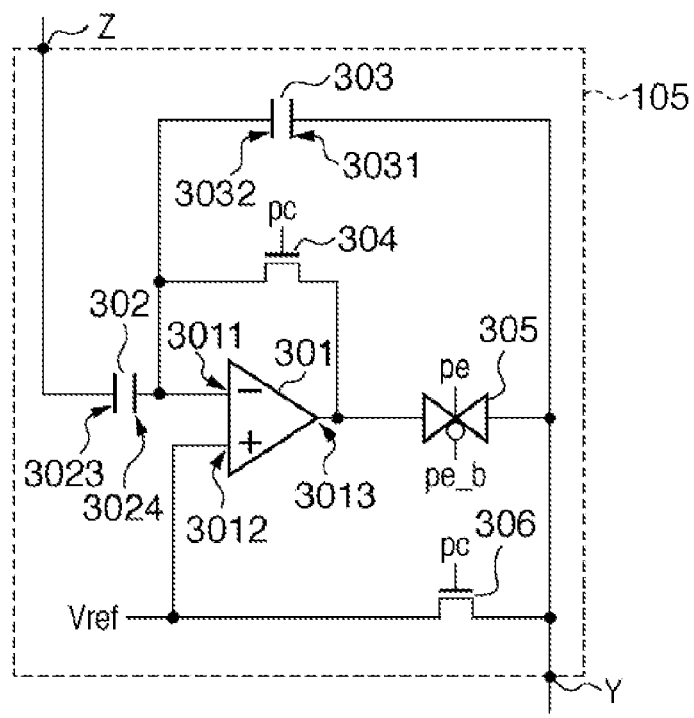
FIG. 3 is a circuit diagram showing the arrangement of a column amplifier in the first embodiment.

The plurality of column amplifier units CA receive the signals output from the pixels in a plurality of columns in each readout row via the plurality of signal lines 103. The plurality of column amplifier units CA correspond to a plurality of columns in the pixel array PA. During a selection period SP (see FIG. 4) to select readout pixels, each column amplifier unit CA receives noise signals and optical signals output from the readout pixels to the signal lines 103 at different timings. Each column amplifier unit CA obtains, amplifies, and transfers a differential signal between the noise signal and the optical signal to the output amplifier 114. More specifically, each column amplifier unit CA can include a column amplifier 105 and holding circuit HC. The column amplifier 105 can include a first input terminal Z, first output terminal Y, operational amplifier 301, input capacitance 302, feedback capacitance 303, first switch 304, second switch 305, and third switch 306, as shown in FIG. 3. The operational amplifier 301 includes an inverting input terminal (second input terminal) 3011, non-inverting input terminal 3012, and output terminal (second output terminal) 3013. The non-inverting input terminal 3012 is connected to a reference voltage terminal supplied with a reference voltage Vref. The feedback capacitance 303 includes a first electrode 3031 and second electrode 3032.

In each column amplifier unit CA, the column amplifier 105 is in a first state in a first duration T1 (see FIG. 4) during the selection period SP. The first state is the state in which the non-inverting input terminal 3012 of the operational amplifier 301 is connected to the first electrode 3031 of the feedback capacitance 303, and the output terminal 3013 of the operational amplifier 301 is connected to both the inverting input terminal 3011 of the operational amplifier 301 and the second electrode 3032 of the feedback capacitance 303. With this structure, a signal including the reference voltage Vref and the offset of the operational amplifier 301 is output from the output terminal 3013 of the operational amplifier 301. A signal including the reference voltage Vref and the offset of the operational amplifier 301 is input to the first electrode 3031 of the feedback capacitance 303. The second electrode 3032 of the feedback capacitance 303 is connected to the reference voltage terminal supplied with the reference voltage Vref. That is, in the column amplifier 105, the feedback capacitance 303 stores the offset of the operational amplifier 301 with reference to the reference voltage Vref of the second electrode 3032.

The column amplifier 105 is in a second state in a second duration T2 after the first duration T1 during the selection period SP. The second state is the state in which the output terminal 3013 of the operational amplifier 301 is connected to the first electrode 3031 of the feedback capacitance 303, and the inverting input terminal 3011 of the operational amplifier 301 is connected to the second electrode 3032 of the feedback capacitance 303. With this structure, a signal including the reference voltage Vref and the offset of the operational amplifier 301 is held at the first electrode 3031 of the feedback capacitance 303. A signal including the reference voltage Vref and the K multiple (K≠1 and K≈1) of the offset of the operational amplifier 301 is input to the second electrode 3032 of the feedback capacitance 303. With this operation, a signal which is a (1−K) multiple of the offset of the operational amplifier 301 is fed back to the inverting input terminal 3011 of the operational amplifier 301, so the column amplifier 105 generates a first signal including an offset smaller than that of the operational amplifier 301 output in the first duration. That is, the column amplifier 105 compresses the signal output from the output terminal 3013 of the operational amplifier 301 in the first duration T1, in other words, the offset of the operational amplifier 301, in accordance with an open-loop gain G of the operational amplifier 301 in the second duration T2. With this operation, the column amplifier 105 generates a first signal in the second duration T2. More specifically, the column amplifier 105 compresses the offset of the operational amplifier 301 to 1/(1+G) times in accordance with the open-loop gain G of the operational amplifier 301 to output a first signal from the output terminal 3013 of the operational amplifier 301. The first signal becomes a signal including the compressed offset and the reference voltage Vref. The compressed offset becomes a signal in which the offset of the operational amplifier 301 is compressed to 1/(1+G) times. The first signal is, for example, an N signal. The column amplifier 105 supplies the generated first signal to the holding circuit HC. The holding circuit HC temporarily holds the supplied first signal.

In a third duration T3 after the second duration T2 during the selection period SP, the column amplifier 105 obtains a differential signal between a noise signal and optical signal which are output from a readout pixel and transferred to it via the signal line 103. The column amplifier 105 amplifies the differential signal to generate a second signal including the amplified differential signal and the first signal. The second signal is, for example, an S signal. The column amplifier 105 supplies the generated second signal to the holding circuit HC. The holding circuit HC temporarily holds the supplied second signal.

Note that the column amplifier 105 may amplify a noise signal to generate, as a first signal, a signal including the amplified noise signal and the above-mentioned reduced offset in the second duration T2. The column amplifier 105 may amplify an optical signal to generate, as a second signal, a signal including the amplified optical signal and the first signal in the third duration T3. In this case, the output amplifier 114 performs a process of obtaining the difference between a noise signal and an optical signal.

In each column amplifier unit CA, the holding circuit HC transfers the first signal and the second signal to the output amplifier 114 during a horizontal scanning period HT (for a readout row) after the selection period SP. For example, the holding circuit HC parallelly performs an operation of transferring the held first signal to a horizontal output line 112 and an operation of transferring the held second signal to a horizontal output line 113 to parallelly transfer the first signal and the second signal to the output amplifier 114. Note that the holding circuits HC in a plurality of columns and the output amplifier 114 may be connected to each other via a single horizontal output line. In this case, for example, the holding circuit HC transfers the held first signal and second signal to the horizontal output line at different timings to, in turn, transfer the first signal and second signal to the output amplifier 114 at different timings. The horizontal scanning circuit 116 horizontally scans the holding circuits HC in a plurality of columns so that signals (first signals and second signals) in the plurality of columns held in the holding circuits HC in the plurality of columns are sequentially transferred to the output amplifier 114 via the horizontal output line. A plurality of signals are sequentially transferred from the plurality of column amplifier units CA to the output amplifier 114 via the horizontal signal lines 112 and 113. The output amplifier 114 generates and outputs an image signal based on the transferred signals (first signals and second signals) in respective columns. That is, the output amplifier 114 performs a CDS process of obtaining the differences between the first signals and the second signals to generate and output an image signal to a subsequent stage (for example, an image capturing signal processing circuit 95 shown in FIG. 5). CDS mentioned herein is an abbreviation for Correlated Double Sampling. Note that the output amplifier 114 may amplify and output a first signal and a second signal so that an image signal is generated by a CDS process of obtaining the difference between the first signal and the second signal in a subsequent stage (for example, the image capturing signal processing circuit 95 shown in FIG. 5).

In this manner, according to this embodiment, the offset output from the operational amplifier 301 in the first duration T1 is compressed in the second duration T2. A first signal including an offset smaller than that of the operational amplifier 301 output in the first duration T1 is generated. A second signal including the amplified differential signal and the first signal is then generated. The first signal and the second signal are transferred to the output amplifier 114. That is, the output amplifier 114 can sufficiently eliminate the offset of the operational amplifier 301 because the offset level of the operational amplifier 301 in the signal transferred to the output amplifier 114 is reduced from that output in the first duration T1. Alternatively, a subsequent stage (for example, the image capturing signal processing circuit 95 shown in FIG. 5) of the output amplifier 114 can sufficiently eliminate the offset of the operational amplifier 301. This makes it possible to obtain an image signal free from any fixed pattern noise.

The detailed arrangement of each column amplifier 105 will be explained next with reference to FIG. 3. FIG. 3 is a circuit diagram showing the arrangement of the column amplifier 105 in the first embodiment of the present invention. The column amplifier 105 includes the operational amplifier 301, the input capacitance 302, the feedback capacitance 303, the first switch 304, the second switch 305, and the third switch 306. The operational amplifier 301 includes the inverting input terminal (second input terminal) 3011, non-inverting input terminal 3012, and output terminal (second output terminal) 3013. The non-inverting input terminal 3012 is supplied with the reference voltage Vref. The input capacitance 302 includes a third electrode 3023 and fourth electrode 3024. A noise signal or an optical signal is input to the third electrode 3023 via the signal line 103 and the input terminal Z of the column amplifier 105. The fourth electrode 3024 is connected to the inverting input terminal 3011 of the operational amplifier 301. The feedback capacitance 303 includes the first electrode 3031 and second electrode 3032.

The first switch 304 is arranged between the inverting input terminal 3011 and output terminal 3013 of the operational amplifier 301. The first switch 304 is, for example, a MOS transistor, and is turned on when a control signal pc at active level is supplied from the vertical scanning circuit 115 or a timing generation unit 98 (see FIG. 5) to its gate. With this operation, the first switch 304 connects the inverting input terminal 3011 and output terminal 3013 of the operational amplifier 301 to each other.

The second switch 305 is arranged between the first electrode 3031 and the output terminal 3013 of the operational amplifier 301. The second switch 305 is, for example, a CMOS switch (a transistor pair having a CMOS configuration), and is turned on when control signals pe and pe_b at active level are supplied from the vertical scanning circuit 115 or the timing generation unit 98 (see FIG. 5) to its gate. At this time, a state in which the first electrode 3031 is connected to the output terminal 3013 of the operational amplifier 301, and the second electrode 3032 is connected to the inverting input terminal 3011 of the operational amplifier 301 is formed. Also, the second switch 305 supplies the signal output from the output terminal 3013 of the operational amplifier 301 to the output terminal Y of the column amplifier 105 upon being turned on.

The third switch 306 is arranged between the first electrode 3031 and the non-inverting input terminal 3012 of the operational amplifier 301. The third switch 306 is, for example, a MOS transistor, and is turned on when a control signal pc at active level is supplied from the vertical scanning circuit 115 or the timing generation unit 98 (see FIG. 5) to its gate. With this operation, a state in which the first electrode 3031 is connected to the non-inverting input terminal 3012 of the operational amplifier 301, and the second electrode 3032 is connected to the inverting input terminal 3011 of the operational amplifier 301 is formed. The third switch 306 supplies the reference voltage Vref to both the first electrode 3031 and the output terminal Y of the column amplifier 105 upon being turned on. Note that at least one of the first switch 304 and the third switch 306 may be a CMOS switch as well as the second switch 305.

The arrangement of the holding circuit HC in each column will be explained next with reference to FIG. 1. The holding circuit HC includes a first holding portion 11 and second holding portion 12. The first holding portion 11 includes a switch N106, holding capacitance N108, and transfer switch N110. The second holding portion 12 includes a switch S107, holding capacitance S109, and transfer switch S111. The first holding portion 11 holds a first signal (N signal). More specifically, the first holding portion 11 transfers a first signal (N signal), output from the output terminal Y of the column amplifier 105, to the holding capacitance N108 when the switch N106 is turned on. The switch N106 is, for example, a CMOS switch, and is turned on when control signals pn and pn_b at active level are supplied from the vertical scanning circuit 115 or the timing generation unit 98 (see FIG. 5) to its gate. With this operation, the switch N106 transfers a first signal (N signal), output from the output terminal Y of the column amplifier 105, to the holding capacitance N108. After that, the switch N106 is turned off. With this operation, the holding capacitance N108 holds the transferred first signal. The transfer switch N110 transfers the first signal held in the holding capacitance N108 to the horizontal output line 112 upon being turned on.

The first holding portion 11 holds a second signal (S signal). More specifically, the second holding portion 12 transfers a second signal (S signal), output from the output terminal Y of the column amplifier 105, to the holding capacitance S109 when the switch S107 is turned on. The switch S107 is, for example, a CMOS switch, and is turned on when control signals ps and ps_b at active level are supplied from the vertical scanning circuit 115 or the timing generation unit 98 (see FIG. 5) to its gate. With this operation, the switch S107 transfers a second signal (S signal), output from the output terminal Y of the column amplifier 105, to the holding capacitance S109. After that, the switch S107 is turned off. With this operation, the holding capacitance S109 holds the transferred second signal. The transfer switch S111 transfers the second signal held in the holding capacitance S109 to the horizontal output line 113 upon being turned on.

Figure 4:
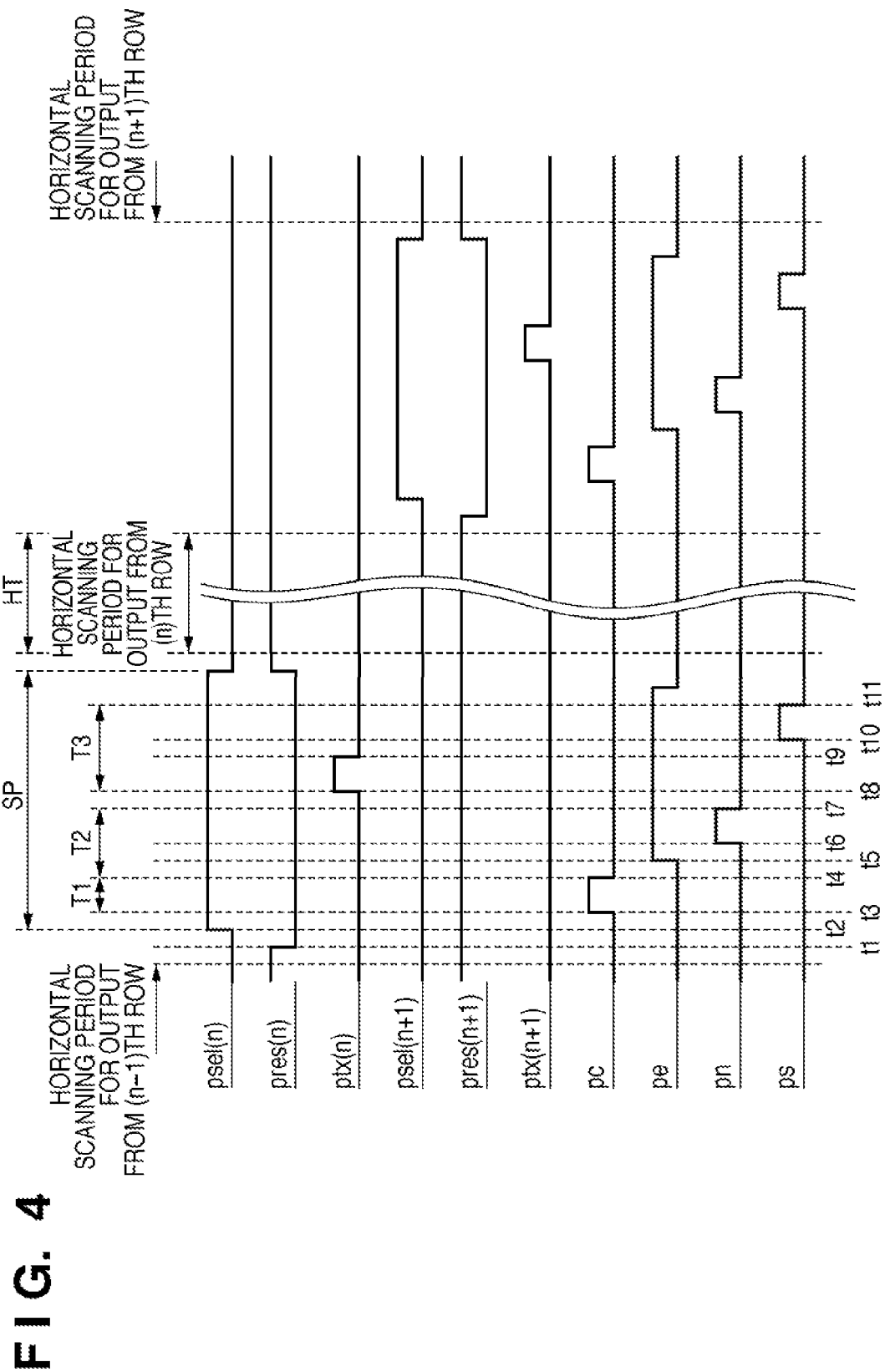
FIG. 4 is a timing chart showing the operation of an image capturing device according to the first embodiment.

The operation of the image capturing device 100 according to the first embodiment of the present invention will be explained next with reference to FIG. 4. FIG. 4 is a timing chart showing the operation of the image capturing device 100 according to the first embodiment of the present invention. Referring to FIG. 4, for example, signals supplied from the vertical scanning circuit 115 to the pixels in the nth row are denoted by reference symbols attached with suffixes (n), and signals supplied from the vertical scanning circuit 115 to the pixels in the (n+1)th row are denoted by reference symbols attached with suffixes (n+1). Also, control signals pc, pe, pn, and ps shown in FIG. 4 correspond to those shown in FIG. 1 or 3. Signals obtained by logically inverting the control signals pe, pn, and ps shown in FIG. 4 correspond to the control signals pe_b, pn_b, and ps_b shown in FIG. 1 or 3. The control signals pe, pn, and ps shown in FIG. 4 are supplied from the vertical scanning circuit 115 or the timing generation unit 98 (see FIG. 5) to corresponding elements.

At time t1, a reset control signal pres(n) changes from active level to non-active level, so the reset portions (reset transistors) 204 in the pixels of the nth row are turned off. The reset operation of the charge-voltage converters 203 in the pixels of the nth row is thus completed.

At time t2, a selection control signal psel(n) changes to active level, so the selection portions (selection transistors) 206 in the pixels of the nth row are turned on. Thus, the pixels in the nth row enter a selected state, and a selection period SP to select the pixels (readout pixels) in the nth row (readout row) begins. The output portions 205 in the pixels of the nth row output noise signals corresponding to the voltages of the charge-voltage converters 203 to the signal lines 103 while the charge-voltage converters 203 are reset by the reset portions 204.

At time t3, the control signal pc changes to active level, whereas the control signal pe remains at non-active level. Thus, the column amplifier unit CA in each column is switched to the first state by turning on the first switch 304 and third switch 306 and turning off the second switch 305. At this time, the inverting input terminal 3011 and output terminal 3013 of the operational amplifier 301 short-circuit, so the noise signal is clamped by the reference voltage Vref. The voltage of the operational amplifier 301 at its output terminal 3013 becomes the one obtained by adding an offset Voff of the operational amplifier 301 to the reference voltage Vref corresponding to the noise signal. A voltage Vx of the operational amplifier 301 at its output terminal 3013 is given by:

$$Vx = Vref + Voff \quad (1)$$

The voltage of the column amplifier 105 at its output terminal Y is reset by the reference voltage Vref via the third switch 306. A voltage Vy0 of the column amplifier 105 at its output terminal Y is given by:

$$Vy0 = Vref \quad (2)$$

The first duration T1 begins at this timing.

At time t4, the control signal pc changes to non-active level. Thus, the column amplifier unit CA in each column is switched from the first state to a third state by turning off all of the first switch 304, the second switch 305, and the third switch 306. The first duration T1 ends at this timing. Also, the second duration T2 begins at this timing.

At time t5, the control signal pe changes to active level. Thus, the column amplifier unit CA in each column is switched from the third state to the second state by turning off the first switch 304 and third switch 306 and turning on the second switch 305. At this time, the output terminal 3013 of the operational amplifier 301 and the output terminal Y of the column amplifier 105 short-circuit. A voltage Vy1 of the column amplifier 105 at its output terminal Y at this time is given by:

$$Vy1 = Vout \quad (3)$$

Using equations (2) and (3), an amount of change in voltage ΔVy at the output terminal Y at this time is given by:

$$\Delta Vy = Vy1 - Vy0 = Vout - Vref \quad (4)$$

The amount of change in voltage ΔVy of the column amplifier 105 at its output terminal Y propagates to the inverting input terminal 3011 of the operational amplifier 301 via the feedback capacitance 303. Hence, the voltage of the operational amplifier 301 at its output terminal 3013 changes by an amount obtained by multiplying the amount of change in voltage ΔVy by the open-loop gain (=G) of the operational amplifier 301. Since the output terminal 3013 of the operational amplifier 301 and the output terminal Y of the column amplifier 105 short-circuit, we have:

$$Vx - G \times \Delta Vy = Vout \quad (5)$$

From equations (1), (4), and (5), the voltage Vout of the column amplifier 105 at its output terminal Y is given by:

$$Vout = Vref + Voff/(1+G) \quad (6)$$

Hence, the offset Voff is compressed to 1/(1+G) times.

At time t6, the control signal pn changes to active level. In response to this change, the switch N106 is turned on to transfer the voltage Vout of the column amplifier 105 at its output terminal Y to the holding capacitance N108 as a first signal (N signal).

At time t7, the control signal pn changes to non-active level. In response to this change, the switch N106 is turned off. Thus, the holding capacitance N108 holds the first signal. The second duration T2 ends at this timing.

At time t8, a transfer control signal ptx(n) changes to active level, so the transfer portions (transfer transistors) 202 in the pixels of the nth row are turned on. Thus, the transfer portions 202 in the pixels of the nth row transfer the charges generated by the photoelectric conversion portions 201 to the charge-voltage converters 203. The third duration T3 begins at this timing.

At time t9, the transfer control signal ptx(n) changes to non-active level, so the transfer portions (transfer transistors) 202 in the pixels of the nth row are turned off. The operation of transferring charges to the charge-voltage converters 203 in the pixels of the nth row is thus completed. In response to this completion, the output portions 205 in the pixels of the nth row output optical signals corresponding to the voltages of the charge-voltage converters 203 to the signal lines 103 while the charges generated by the photoelectric conversion portions 201 are transferred to the charge-voltage converters 203 by the transfer portions 202. At this time, the control signal pc is at non-active level, and the control signal pe is at active level. Hence, the column amplifier unit CA in each column is switched to the second state by turning off the first switch 304 and third switch 306 and turning on the second switch 305. Thus, the column amplifier unit CA in each column obtains a differential signal between the noise signal and the optical signal by a clamp operation, and amplifies the obtained differential signal, thereby generating a second signal (S signal).

At time t10, the control signal ps changes to active level. In response to this change, the switch S107 is turned on to transfer the voltage Vout of the column amplifier 105 at its output terminal Y to the holding capacitance S109 as a second signal (S signal).

At time t11, the control signal ps changes to non-active level. In response to this change, the switch S107 is turned off. Thus, the holding capacitance S109 holds the second signal. The third duration T3 ends at this timing.

After that, the selection period SP for the nth row (readout row) ends. After the selection period SP for the nth row (readout row) ends, a horizontal scanning period HT for the nth row (readout row) begins. During the horizontal scanning period HT, the horizontal scanning circuit 116 horizontally scans the holding circuits HC in a plurality of columns so that signals (first signals and second signals) in the plurality of columns held in the holding circuits HC in the plurality of columns are sequentially transferred to the output amplifier 114 via the horizontal output lines. The output amplifier 114 generates and outputs an image signal based on the transferred signals (first signals and second signals) in respective columns. That is, the output amplifier 114 performs a CDS process of obtaining the differences between the first signals and the second signals to generate and output an image signal to a subsequent stage (for example, the image capturing signal processing circuit 95 shown in FIG. 5).

A case in which first signals are not transferred to the output amplifier but only second signals are transferred to the output amplifier, and the output amplifier or its subsequent stage generates an image signal based on the second signals will be considered herein. In this case, a horizontal output line is formed on a semiconductor substrate and is connected to it by capacity coupling, as described in detail in Japanese Patent Laid Open No. 2003-198949. At the timing to read out signals to the horizontal output line, the input terminal has a high impedance and therefore is likely to be adversely affected by disturbance noise attributed to capacity coupling. The adverse effect of such disturbance noise is a problem that conspicuously arises especially in an image capturing device of semiconductor chips. This is because a chip of an image capturing device is likely to be larger than other semiconductor chips. Along with this tendency, as the horizontal signal line elongates, the coupling capacitance with the semiconductor substrate increases. An image capturing device for a still camera, for example, is formed from a large chip as a whole, including chips having optical formats with, for example, the APS-C size, APS-H size, and the 35-mm full size. In such a case, if disturbance noise mixes in second signals in the process of transferring the second signals to the output amplifier via the horizontal output line, an image signal generated based on the second signals by the output amplifier or its subsequent stage contains a large amount of disturbance noise. This leads to deterioration in quality of an image obtained based on the image signal.

In contrast to this, in this embodiment, the holding capacitances respectively hold a first signal generated by compressing an offset, output from the operational amplifier 301 in the first duration T1, in the second duration T2, and a second signal including the amplified differential signal and the first signal. After that, the first signal and the second signal are transferred to the output amplifier. At this time, disturbance noise mixes in the first signal and the second signal at the same level in the process of transferring the first signal and the second signal to the output amplifier via the horizontal output lines. Hence, it is possible to eliminate the offset of the operational amplifier 301 and generate an image signal free from the adverse effect of disturbance noise by obtaining the difference between a first signal and a second signal by the output amplifier or its subsequent stage.

As described above, according to this embodiment, it is possible to reduce the offset of the column amplifier and obtain a high-quality image free from the adverse effect of disturbance noise conspicuously occurs in an image capturing device.

Figure 5:
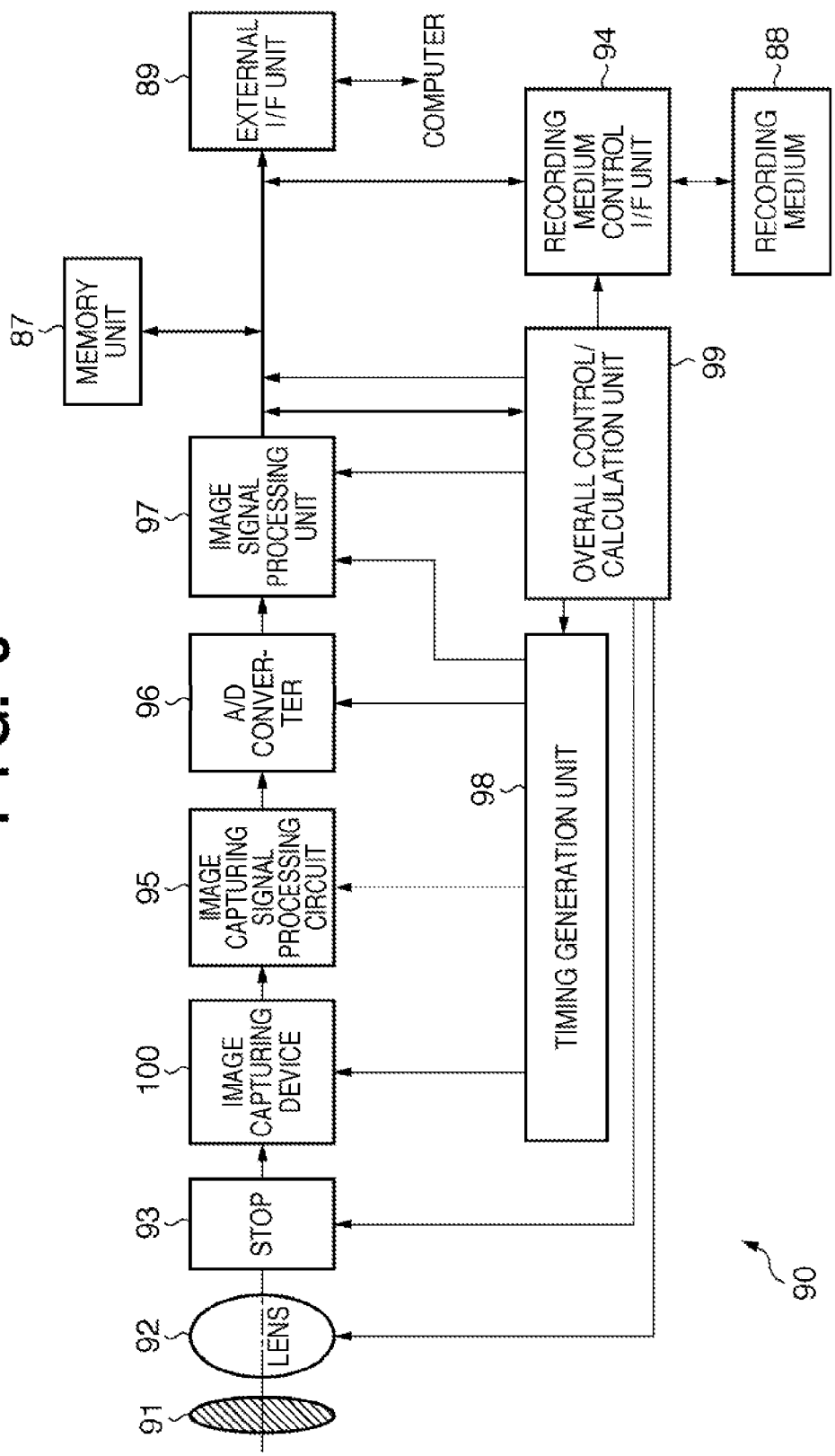
FIG. 5 is a block diagram illustrating the configuration of an image capturing system to which the image capturing device according to the first embodiment is applied.

FIG. 5 illustrates one example of an image capturing system to which the image capturing device according to the present invention is applied. An image capturing system 90 mainly includes an optical system, image capturing device 100, and signal processing unit. The optical system mainly includes a shutter 91, lens 92, and stop 93. The signal processing unit mainly includes an image capturing signal processing circuit 95, A/D converter 96, image signal processing unit 97, memory unit 87, external I/F unit 89, timing generation unit 98, overall control/calculation unit 99, recording medium 88, and recording medium control I/F unit 94. Note that the signal processing unit need not always include a recording medium 88.

The shutter 91 is inserted in the optical path immediately upstream of the lens 92, and controls exposure. The lens 92 refracts the incident light to form an object image on the pixel array (imaging surface) of the image capturing device 100. The stop 93 is inserted in the optical path between the lens 92 and the image capturing device 100 and adjusts the amount of light that is guided to the image capturing device 100 after passing through the lens 92. The image capturing device 100 converts the object image formed on the pixel array into an image signal. The image capturing device 100 reads out the image signal from the pixel array and outputs it. The image capturing signal processing circuit 95 is connected to the image capturing device 100 and processes the image signal output from the image capturing device 100. The A/D converter 96 is connected to the image capturing signal processing circuit 95 and converts the processed image signal (analog signal) output from the image capturing signal processing circuit 95 into an image signal (digital signal).

The image signal processing unit 97 is connected to the A/D converter 96 and performs calculation processes such as various types of correction for the image signal (digital signal) output from the A/D converter 96 to generate image data. The generated image data is supplied to, for example, the memory unit 87, external I/F unit 89, overall control/calculation unit 99, and recording medium control I/F unit 94. The memory unit 87 is connected to the image signal processing unit 97 and stores the image data output from the image signal processing unit 97. The external I/F unit 89 is connected to the image signal processing unit 97. With this structure, the image data output from the image signal processing unit 97 is transferred to an external device (for example, a personal computer) via the external I/F unit 89. The timing generation unit 98 is connected to the image capturing device 100, image capturing signal processing circuit 95, A/D converter 96, and image signal processing unit 97. With this structure, timing signals are supplied to the image capturing device 100, image capturing signal processing circuit 95, A/D converter 96, and image signal processing unit 97. The image capturing device 100, image capturing signal processing circuit 95, A/D converter 96, and image signal processing unit 97 operate in synchronism with the timing signals. The overall control/calculation unit 99 is connected to the timing generation unit 98, image signal processing unit 97, and recording medium control I/F unit 94 to systematically control them. The recording medium 88 is detachably connected to the recording medium control I/F unit 94. With this structure, the image data output from the image signal processing unit 97 is recorded on the recording medium 88 via the recording medium control I/F unit 94. With the above-mentioned arrangement, a satisfactory image (image data) can be obtained as long as a satisfactory image signal is obtained in the image capturing device 100.

Second Embodiment

The second embodiment will be explained next. The first embodiment exemplified a case in which an operational amplifier is adopted as the column amplifier 105. The second embodiment will exemplify a case in which an inverting amplifier, especially a common-source circuit is adopted in place of an operational amplifier.

Figure 6:
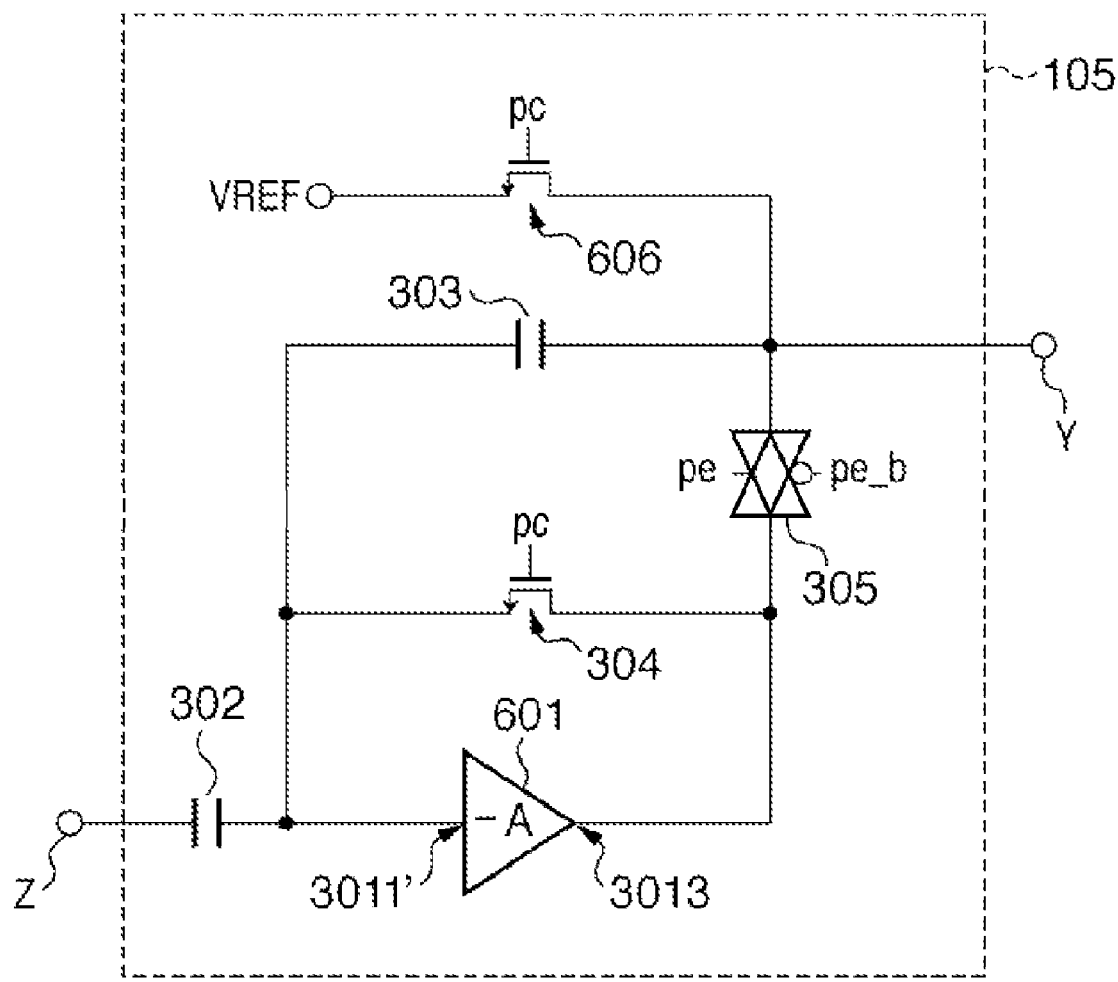
FIG. 6 is a circuit diagram showing the arrangement of a column amplifier in the second embodiment.
Figure 7A:
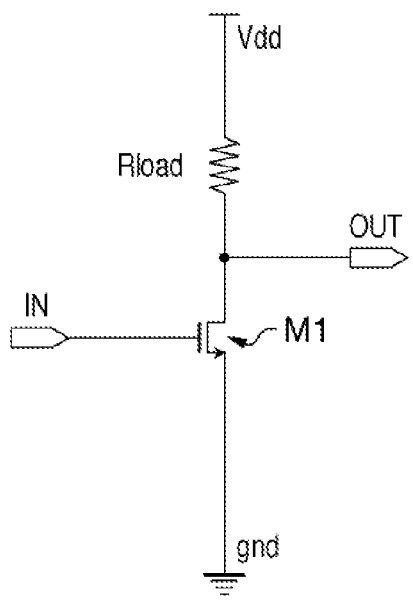
FIGS. 7A to 7D are circuit diagrams illustrating variations of an inverting amplifier.

FIG. 6 shows a column amplifier 105 in the second embodiment of the present invention. The same reference numerals as in the first embodiment denote parts having the same functions in FIG. 6, and a detailed description thereof will not be given. The differences from the first embodiment reside in that a switch (third switch) 606 for supplying VREF is used, and the amplifier used is changed from the operational amplifier 301 to an inverting amplifier 601. The inverting amplifier 601 includes an input terminal (second input terminal) 3011' and output terminal (second output terminal) 3013. Variations of the inverting amplifier 601 will be explained with reference to FIGS. 7A to 7D. Each of these amplifiers includes a common-source amplifier circuit. A common-source amplifier circuit includes only one input terminal, unlike an operational amplifier. Also, a common-source amplifier circuit includes no node supplied with a reference voltage Vref. An example of the inverting amplifier shown in FIG. 7A will be explained first. Referring to FIG. 7A, reference symbol M1 denotes an n-channel MOS transistor; Rload, a resistance element serving as a load for an inverting amplifier; and IN and OUT, an input terminal (second input terminal) and output terminal (second output terminal), respectively, of the inverting amplifier. When the input terminal IN and output terminal OUT of the inverting amplifier short-circuit, respective voltage values VIN and VOUT depend on the threshold voltage of the n-channel MOS transistor M1 (VIN=VOUT in this case). It is possible to perform gain compression of the offset of the common-source amplifier circuit in the same way as in the operational amplifier shown in the first embodiment.

Figure 7B:
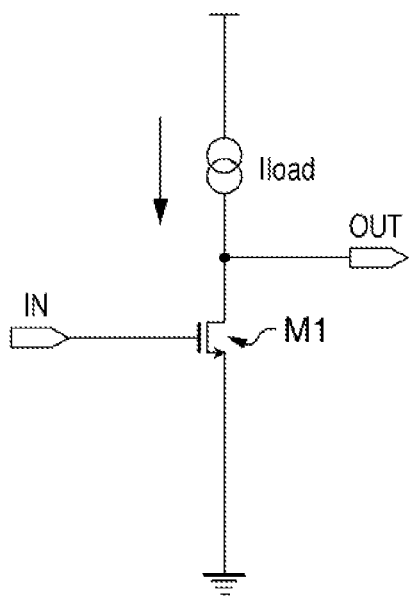

The inverting amplifier shown in FIG. 7B will be explained. The inverting amplifier shown in FIG. 7B is different from that shown in FIG. 7A in that in the former a constant current source Iload serves as its load. When an input terminal IN and output terminal OUT of the inverting amplifier shown in FIG. 7B short-circuit, respective voltage values VIN and VOUT depend on the threshold voltage of an n-channel MOS transistor M1 (VIN=VOUT in this case) as well. While the current consumption of the inverting amplifier shown in FIG. 7A changes depending on its voltage values VOUT at the output terminal OUT, that of the inverting amplifier shown in FIG. 7B fluctuates only slightly depending on its output voltage.

Figure 7C:
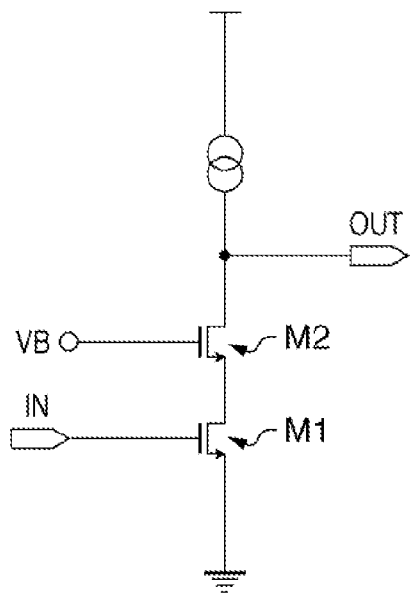

The inverting amplifier shown in FIG. 7C is obtained by improving the characteristics of the inverting amplifier shown in FIG. 7B. Referring to FIG. 7C, reference symbol M2 denotes an n-channel MOS transistor. The inverting amplifier shown in FIG. 7C is different from that shown in FIG. 7B in that the former additionally includes the n-channel MOS transistor M2. The n-channel MOS transistor M2 is generally called a common-gate transistor, and the open-loop gain of the amplifier can be raised by optimally designing its gate voltage VB. Even such circuitry is applicable to the present invention as long as it is designed such that an optimum operating point is obtained when an input terminal IN and output terminal OUT short-circuit.

Figure 7D:
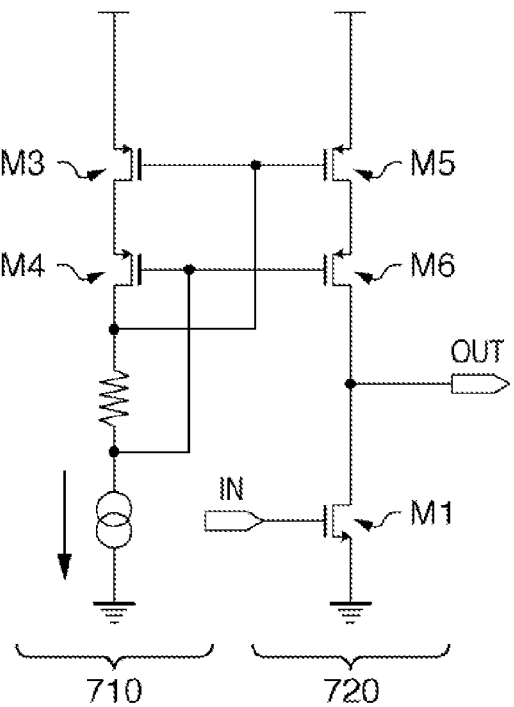

FIG. 7D illustrates a case in which the constant current load on the inverting amplifier shown in FIG. 7B is formed from a p-channel MOS transistor. Referring to FIG. 7D, reference symbols M3 to M6 denote p-channel MOS transistors. The p-channel MOS transistors M3 and M5 form a current mirror circuit, and the p-channel MOS transistors M4 and M6 form a common-gate circuit to improve the load characteristics. The inverting amplifier shown in FIG. 7D includes a bias portion 710 and common-source amplifier portion 720. The bias portion 710 determines the gate voltages of the transistors M3 and M5 and those of the transistors M4 and M6 using a constant current source and a resistance element. The common-source amplifier portion 720 operates using the n-channel MOS transistor M1 as a common-source transistor and using the p-channel MOS transistors M5 and M6 as constant current loads on the inverting amplifier.

Although all n-channel MOS transistors serve as common-source transistors in the above-mentioned example, a common-source circuit formed from a p-channel MOS transistor is also applicable to the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-120393, filed May 18, 2009 and No. 2010-100358, filed Apr. 23, 2010, which are hereby incorporated by reference herein in their entirety.

The invention claimed is:

1. An image capturing device comprising a pixel array in which a plurality of pixels each including a photoelectric conversion portion are arrayed, a plurality of signal lines connected to the pixel array, and a plurality of column amplifiers configured to respectively amplify signals transferred from the pixel array via the signal lines,
wherein the column amplifier comprises:
a first input terminal;
a first output terminal;
an amplifier having a second input terminal and a second output terminal;
a feedback capacitance arranged between the second input terminal and the first output terminal;
an input capacitance having an electrode connected to the first input terminal, and an electrode connected to the second input terminal;
a first switch arranged between the second input terminal and the second output terminal;
a second switch arranged between the first output terminal and the second output terminal; and
a third switch arranged between a reference voltage terminal and the first output terminal.

2. The device according to claim 1, wherein the amplifier includes a common-source amplifier circuit.

3. The device according to claim 1, wherein the amplifier includes an operational amplifier including an inverting input terminal serving as the second input terminal, a non-inverting input terminal connected to the reference voltage terminal, and the second output terminal.

4. The device according to claim 1, wherein
the column amplifier is in a first state in which the reference voltage terminal is connected to the first output terminal, and the second output terminal is connected to the second input terminal, in a first duration, and is in a second state in which the second output terminal is connected to the first output terminal, in a second duration after the first duration and in a third duration after the second duration, and
the column amplifier generates a first signal in the second duration, and amplifies the signal, which is output from the pixel array and transferred via the signal line, in the third duration, thereby generating a second signal including the amplified signal and the first signal.

5. The device according to claim 4, wherein the column amplifier is configured to compress the signal output from the second output terminal of the amplifier in the first duration, in accordance with an open-loop gain of the amplifier in the second duration to generate the first signal in the second duration.

6. The device according to claim 5, wherein the column amplifier is set in the first state by turning on the first switch and the third switch and turning off the second switch in the first duration, and is set in the second state by turning off the first switch and the third switch and turning on the second switch in the second duration.

7. The device according to claim 1, wherein the second switch includes a CMOS switch.

8. The device according to claim 4, further comprising:
a first holding portion configured to hold the first signal; and
a second holding portion configured to hold the second signal,
wherein the first holding portion is configured to hold the first signal in the first duration, the second holding portion holds the second signal in the second duration, and the first signal held in the first holding portion is output and the second signal held in the second holding portion is output in the third duration.

9. An image capturing system comprising:
an image capturing device defined in claim 1;
an optical system configured to form an image on an imaging surface of the image capturing device; and
a signal processing unit configured to process the signal output from the image capturing device to generate image data.

10. A method of driving an image capturing device comprising a pixel array in which a plurality of pixels each including a photoelectric conversion portion are arrayed, a plurality of signal lines connected to the pixel array, a plurality of column amplifiers configured to respectively amplify signals transferred from the pixel array via the signal lines, and an output amplifier to which a plurality of signals are sequentially transferred from the plurality of column amplifiers,
wherein the column amplifier comprises:
a first input terminal;
a first output terminal;
an amplifier having a second input terminal and a second output terminal;
a feedback capacitance arranged between the second input terminal and the first output terminal;
an input capacitance including an electrode connected to the first input terminal, and an electrode connected to the second input terminal;
a first switch arranged between the second input terminal and the second output terminal;
a second switch arranged between the first output terminal and the second output terminal; and
a third switch arranged between a reference voltage terminal and the first output terminal, and
the driving method comprises the steps of:
connecting the reference voltage terminal to the first output terminal and connecting the second output terminal to the second input terminal;
connecting the second output terminal to the first output terminal to generate a first signal; and
amplifying the signal transferred from the pixel array via the signal line to generate a second signal including the amplified signal and the first signal.

* * * * *